Oct. 26, 1965                T. E. FRANKLIN                3,214,511
                    CASING AND INSULATOR BUSHING ASSEMBLY
Filed Dec. 23, 1963                                  3 Sheets-Sheet 1
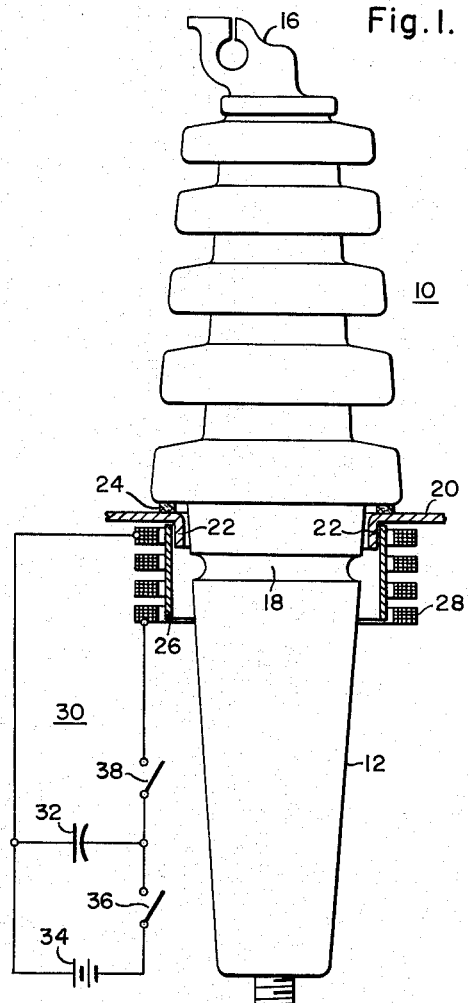
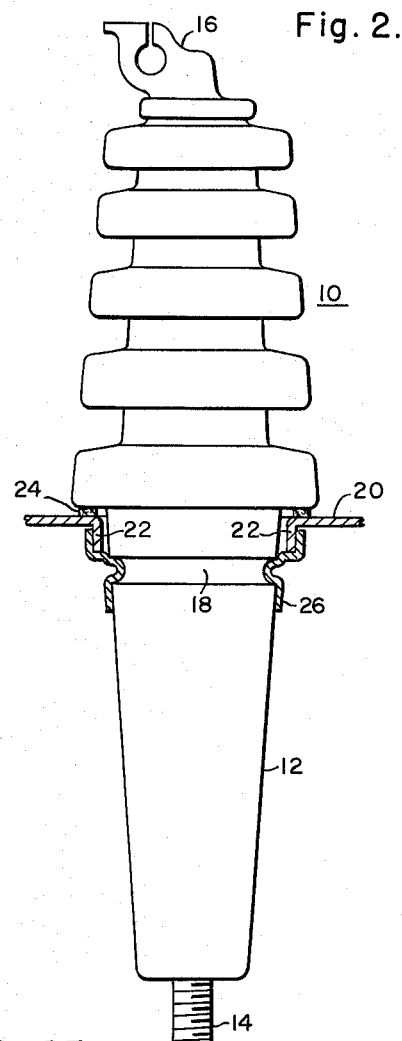
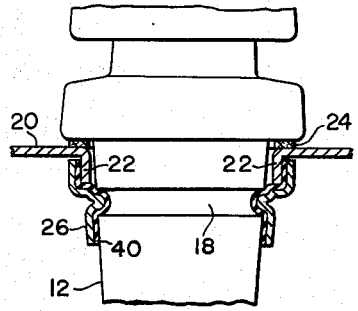
WITNESSES
Edwin E. Basler
Floy M. Garman
INVENTOR
Terrell E. Franklin
BY Donald R. Lackey
ATTORNEY Oct. 26, 1965 T. E. FRANKLIN 3,214,511
CASING AND INSULATOR BUSHING ASSEMBLY
Filed Dec. 23, 1963 3 Sheets-Sheet 2

Oct. 26, 1965 T. E. FRANKLIN 3,214,511
CASING AND INSULATOR BUSHING ASSEMBLY
Filed Dec. 23, 1963 3 Sheets-Sheet 3

United States Patent Office 3,214,511
Patented Oct. 26, 1965

3,214,511
CASING AND INSULATOR BUSHING
ASSEMBLY
Terrell E. Franklin, Birmingham, Ala., assignor to Westinghouse Electric Corporation, East Pittsburgh, Pa., a corporation of Pennsylvania
Filed Dec. 23, 1963, Ser. No. 332,538
6 Claims. (Cl. 174—153)

This invention relates in general to insulating bushings for electrical apparatus and more particularly to insulating bushings, their support or mounting members, and methods of assembling same with electrical apparatus.

The installation of bushings on the casing or tank of electrical apparatus, such as transformers, generally requires the use of a clamping ring-garter spring arrangement, or the use of a nut which tightens on threads cut or formed directly on the shank of the bushing. It would be desirable to reduce the number of mounting members required, and the amount of cutting or forming on the bushing, thus reducing the cost of the assembly and the time required to mount the bushing, and still produce an effective seal without the danger of a mounting member loosening due to vibration or other causes.

Accordingly, it is an object of this invention to provide a new and improved bushing and mounting member for electrical apparatus.

Another object of this invention is to provide a new and improved bushing assembly for electrical apparatus which requires only one mounting member to securely hold a bushing in sealed, assembled relationship with the casing of the electrical apparatus.

A further object of the invention is to provide a new and improved bushing assembly for electrical apparatus which utilizes a mounting member which will not loosen due to magnetostriction vibration, or other causes.

Another object of this invention is to provide a new and improved bushing assembly for electrical apparatus which utilizes a mounting member which closely conforms to the shape of the members it is to hold and is fixedly engaged thereto.

Still another object of the invention is to provide a new and improved method of assembling an insulating bushing into an opening in the casing of electrical apparatus.

Another object of the invention is to provide a new and improved method of assembling a bushing into an opening in the casing of electrical apparatus, utilizing magnetic forming to hold and seal the bushing in the desired assembled relationship with the casing of the electrical apparatus without the necessity of magnetically forming any part of the casing itself.

A further object of this invention is to provide a new and improved method of assembling a bushing into an opening in the casing of electrical apparatus, utilizing magnetic forming of a cylindrical sleeve member to hold the bushing in assembled, sealed relationship with the casing.

Another object of the invention is to provide a new and improved method of assembling a bushing into an opening in the casing of electrical apparatus which is accurately repeatable and not dependent upon the judgment of the operator.

Briefly, one embodiment of the present invention accomplishes the above cited objects by providing a bushing assembly which requires only that the bushing have a locking portion, such as a circumferential groove, disposed between its ends, and that the opening in the casing of the electrical apparatus be flanged. The bushing is disposed axially in the opening in the casing such that the locking portion extends past but is adjacent the projecting end of the flange. A cylindrical metallic sleeve member is disposed coaxially over the end of the bushing such that at least a portion of the flange, and the locking portion of the bushing is covered by said sleeve. The metallic sleeve member is then magnetically formed to the contour of the flange and bushing, fixedly maintaining the bushing and casing in assembled, sealed relationship. Another embodiment of the invention eliminates the requirement of flanging the opening in the electrical apparatus, by utilizing a resilient ring member, or by utilizing a cylindrical sleeve member having a projecting flanged portion.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings in which:

FIG. 1 is an elevational view of a bushing just prior to assembly, partially in section and including a representative schematic diagram;

FIG. 2 is an elevational view of the bushing shown in FIG. 1 after assembly has been completed;

FIG. 3 is a fragmentary view of a bushing assembly illustrating another embodiment of the invention;

Figure 7:
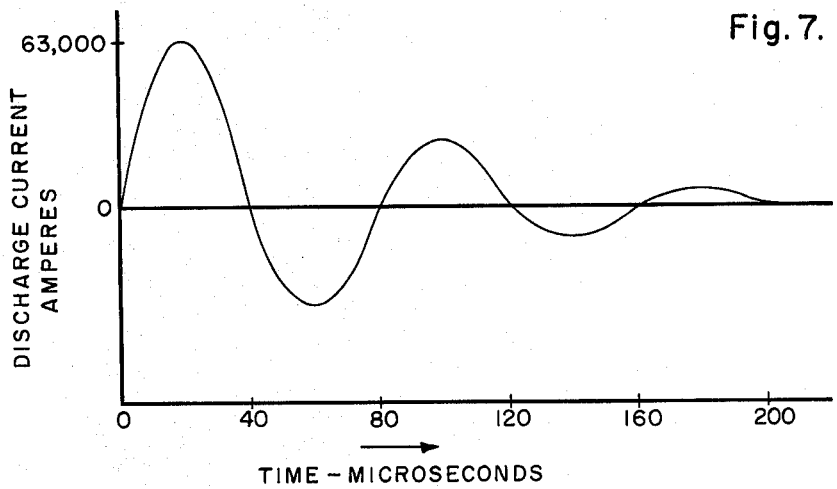
Figure 8:
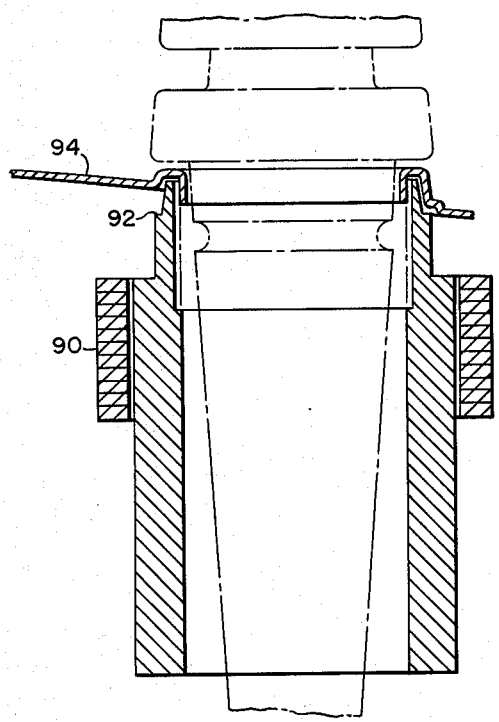

FIG. 7 is a typical oscillogram of the discharge current of a bank of capacitors used to magnetically form the sleeve member which holds the bushing in assembled, sealed relationship with the casing of electrical apparatus; and FIG. 8 is an elevational view, in section, of how auxiliary flux shaping means may be utilized to distribute the flux uniformly and to direct the flux into areas where required.

Referring now to the drawings, and FIG. 1 in particular, there is shown an elevational view of an electrical insulating bushing assembly 10, having a bushing 12 which generally has a cylindrical elongated body portion constructed of an electrically insulating material, such as porcelain, and having a conductor rod 14 extending therethrough. The conductor rod 14 is connected to a cable connector 16 at the top of the bushing 12 in a conventional manner. As illustrated, the bushing 12 has a circumferential groove 18 located intermediate its ends on the portion of the bushing 12 that usually extends inside the casing of electrical apparatus. Although, only one grooved portion 18 is shown, it is to be understood that a plurality of grooves, or any other irregularities or configurations, such as undercuts or projections which provide locking action, may be provided if desired. The bushing 12 of bushing assembly 10 is disposed axially through an opening in the casing 20 of electrical apparatus, with an annular projection or extending flanged portion 22 defining said opening. The bushing 12 is positioned in the opening in the casing 20 such that its grooved portion 18 lies a predetermined distance beyond but adjacent the end of the projecting flange 22. A washer or gasket member 24 may be used to locate a projecting portion of the bushing 12 from the casing 20 of the electrical apparatus. A metallic, cylindrical sleeve member 26, formed of copper, aluminum, or other electrical conductor, is telescoped or coaxially disposed over the bushing 12 such that it surrounds the grooved portion 18 of the bushing 12, and at least a portion of the projecting flange 22 of the casing 20. When the bushing 12 of the bushing assembly 10, the casing 20, and cylindrical sleeve 26 are all located in the proper relative position, such as in a holding jig, a conductor 28 in the shape of a solenoid or coil is disposed to surround the cylindrical sleeve 26. The conductor or coil 28 may be an integral portion of a holding and locating jig such that the sleeve member 26 may first be inserted into the coil 28 in the proper position. The casing 20 may then be disposed such that its flanged portion 22 extends for a predetermined distance into the sleeve member 26, and the bushing 12 may then be disposed axially through the opening in the casing 20 defined by the projecting flange 22.

By transferring a large quantity of electrical energy into the coil 28 from electrical circuit 30 over a very short period of time, an electrical field will be created which will produce a magnetic pressure on sleeve member 26 sufficient to swage or form the sleeve member tightly against the flange 22 and the adjacent portion of bushing 12, including the circumferential groove 18. The electrical circuit 30 may include a capacitor, or bank of capacitors 32, which are charged to a predetermined potential by a source of unidirectional potential, represented by battery 34, when switch 36 is closed. Although a battery symbol 34 is shown for simplicity, the source of unidirectional potential will usually take the form of the conventional alternating to direct current power supply, including a source of alternating potential, a transformer to obtain a desired voltage magnitude, and rectifier elements to change the alternating potential to a unidirectional potential.

The sleeve member 26 is formed when capacitor bank 32 is discharged through coil 28, by the closing of switch 38, which may be an ignitron, thyratron, or the like.

FIG. 2 illustrates the bushing assembly 10 shown in FIG. 1, after the metallic sleeve member 26 has been magnetically swaged to the contour of the flange 22 and the adjacent portion of bushing 12, including grooved portion 18. The sleeve member 26 after being magnetically swaged, acts like an integral fixed portion of the projecting flange 22 and bushing 12, tightly and permanently holding bushing 12 in the proper assembled and fixed relationship with casing 20, and at the same time provides an excellent hermetic seal.

Thus, in one quick operation, a bushing is mounted in fixed assembled relationship with the casing of its associated electrical apparatus. No nuts or ring-garters are required. The final holding and sealing operation is not dependent upon the skill of an operator, but is provided with precisely the same amount of forming energy each time without dependency upon human judgment. Further, the holding and sealing functions are performed by the addition of a single, inexpensive hollow sleeve-like member.

The hollow sleeve member 26 solves many problems which would be associated with trying to assemble a bushing into an opening in the casing of electrical apparatus, using the principles of magnetic forming. For example, the amount of electrical energy required to form a cylindrical conductor depends upon the electrical conductivity of the conductor and its wall thickness. The better the electrical conductivity of the conductor, the easier it is to magnetically form; likewise, the thinner the wall of the conductor, the easier it is to magnetically deform. If the flanged portion 22 of the casing 20 were to be punched with sufficient projection that it could be magnetically formed around the body 12 of bushing assembly 10, the comparatively heavy wall thickness of the casing, dictated by the strength required of the casing, along with the lower conductivity of steel, of which most enclosures are constructed, compared with aluminum or copper, would require a power supply 30 of such a large magnitude that magnetic forming as a means for assembling electrical insulating bushings would not be practical. Further, the punch forming of the flange 22 would cold work the flange 22 to an extent that annealing would probably be required before any more forming of the flange 22 could be safely accomplished. The metallic sleeve 26 is of such small size that good conductors of electricity, such as copper or aluminum may be utilized without regard to the fact that aluminum or copper may cost more per pound than steel. Also, the wall thickness of the sleeve member 26 may be considerably less than the wall thickness of the casing 20, as the sleeve member 26 does not have to form a strong protective enclosure for heavy electrical apparatus. Further, the projecting flange may have a much shorter projection when using the auxiliary sleeve member 26, greatly reducing the possibility of cracking the flange due to cold working of the material.

For example, in one application for assembling a porcelain bushing having an outside diameter of approximately 3 inches, the steel casing forming the flanged opening had a wall thickness of .105 inch while the magnetically formed aluminum sleeve had a wall thickness of only .032 inch. The power supply utilized capacitors totaling 29 microfarads charged to a potential of 17 kv., which gave a maximum field strength of 630,000 ampere turns when discharged into a coil having 10½ turns formed of heavy copper strap. A typical oscillogram showing the discharge current wave form and the duration is shown in FIG. 7. The first and greatest current crest was 63,000 amperes, occurring 20 microseconds after the start of the discharge.

If the magnetic forming were to be formed on the flange 22 itself, a power supply of such magnitude would be required that the process would be impractical from a cost standpoint, as well as the possibility of cracking the already cold worked flange due to the excessively long draw required.

The magnetically formed sleeve member 26 forms an excellent hermetic seal between the flange 22 and the bushing 12. However, in some instances, it may be desirable to utilize a sleeve member 26 having a resilient coating 40 on its internal diameter, as shown in the fragmentary view of a bushing assembly in FIG. 3. A resilient coating 40, such as neoprene, would solve any problem which may arise due to the different coefficients of expansion of the projecting flange, the porcelain insulator, and the metallic sleeve member.

Figure 4:
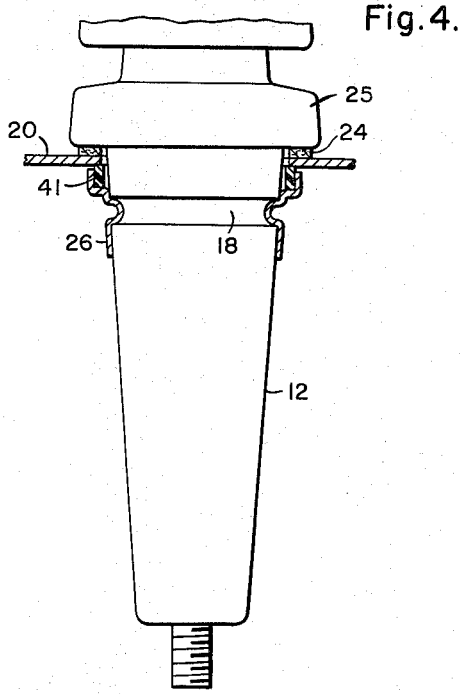
FIG. 4 is a fragmentary view of a bushing assembly illustrating an embodiment of the invention which does not require that the casing of the electrical apparatus be flanged.

The assembly of a bushing, having at least one transverse projecting portion 25, into the casing of electrical apparatus may be performed without flanging the casing of the electrical apparatus, by the addition of a resilient member 41, as shown in FIG. 4. Like components in FIGS. 3 and 4 are designated with like reference numerals to illustrate the changes and additions which were made. It will be noted that the flange 22, as shown in FIG. 3 is missing in FIG. 4, and that an annular member or washer, constructed of resilient material, such as neoprene, is disposed such that the magnetically swaged sleeve member 26 is formed around at least a portion of the resilient member 41. The resilient member 41 forms the required seal and, along with projecting portion 25, prevents the bushing 12 from moving in an axial direction.

Figure 5A:
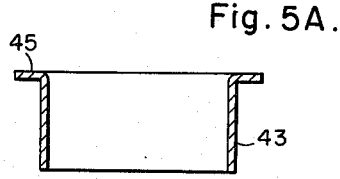
FIG. 5A is an elevational view, in section, illustrating a cylindrical sleeve member that may be used in the embodiment of the invention shown in FIG. 5.
Figure 5:
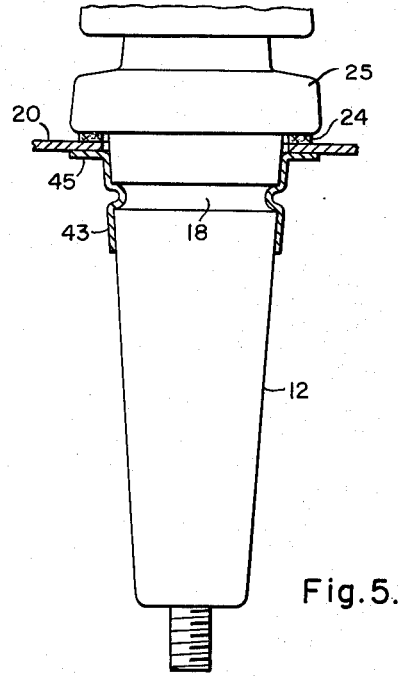
FIG. 5 is a fragmentary view of a bushing assembly illustrating another embodiment of the invention which does not require that the casing of the electrical apparatus be flanged.

FIGURES 5 and 5a show another embodiment of the invention which does not require that the casing of the electrical equipment 20 be flanged. Like components in FIGS. 3, 4 and 5 are designated with like reference numerals to illustrate the changes made. This embodiment requires a cylindrical sleeve member 43 shaped prior to the swaging operation as shown in FIG. 5A. More specifically, the cylindrical sleeve member 43 should have a projecting flanged portion 45 at one end thereof.

This projecting flanged portion 45 of sleeve member 43 should be disposed in the bushing assembly so that it rests up against the casing 20, around the opening provided in casing 20 for the bushing 12.

The magnetic swaging of sleeve member 43 will then force the sleeve member 43 into tight contact with the casing 20 and the bushing 12, providing a tight seal and cooperating with projection 25 to hold the bushing 12 in assembled relation with the casing 20.

Figure 6:
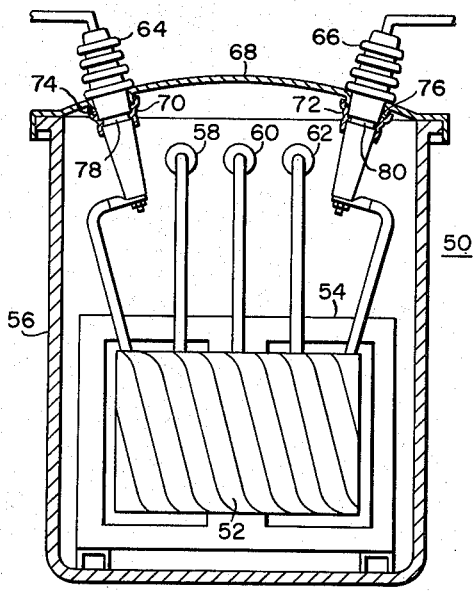
FIG. 6 is an elevational view, in section, of a transformer utilizing bushing assemblies constructed according to the teachings of this invention.

FIG. 6 is an elevational view of a transformer 50, partially in section, having high and low voltage windings 52 wound upon a magnetic core 54 and disposed in a tank or casing 56. The tank or casing 56 may contain the conventional dielectric fluid for cooling and insulating purposes. The low voltage windings are connected to bushings 58, 60 and 62, which are shown mounted on the side of a tank 56. The high voltage windings are connected to high voltage bushings 64 and 66, which are shown mounted on the cover 68. The high voltage bushings 64 and 66 are shown in assembled and sealed relationship, using magnetically formed conductive sleeves 70 and 72, respectively, according to the principles of one embodiment of this invention.

A suitable method of assembling high voltage bushings 64 and 66 would comprise the steps of punching the cover 68 to provide openings therein. The openings may be defined by projecting flanges 74 and 76, if the particular embodiment pursued requires flanges, or they may be eliminated if not required, providing bushings 64 and 66 with locking portions, such as circumferential grooves 78 and 80, disposing the bushings 64 and 66 axially through the openings until the grooved portions 78 and 80, extend a predetermined distance past the ends of the projecting flanges 74 and 76, respectively, telescoping metallic sleeve members 70 and 72 over bushings 64 and 66, respectively, such that the sleeve members cover a portion of the flange and at least the portion of the bushings containing the grooved portions 78 and 80, and magnetically forming the sleeve members 70 and 72 to conform to the complete circumferential contour of the flange and bushing.

If the embodiment chosen did not require a flange portion around the opening in the casing, one suitable method of assembly would comprise the steps of punching the casing 20, as shown in FIG. 4, to provide an opening therein, providing a bushing 12 with a circumferential groove 18, disposing the bushing 12 axially through the opening in casing 20, disposing a resilient ring-like member or washer 41 axially over the bushing 12 until it rests against or adjacent the casing 20, telescoping the sleeve member 26 over the grooved portion 18 of the bushing 12 and at least a portion of resilient member 41, and magnetically forming the sleeve member 26 to conform to the contour of the resilient member 41 and the bushing 12, including the groove 18.

Another method of assembly not involving flanging the casing around the opening in the casing would comprise the steps of punching the casing 20 to provide an opening as shown in FIG. 5, providing a bushing 12 with a circumferential groove 18, telescoping a sleeve member 43, having a flange-like projection 45 at one end thereof, over the grooved portion 18 of the bushing 12 until the flange 45 rests against the casing 20, and magnetically forming the sleeve member 43 to conform to the contour of the bushing 12, including the groove 18, with the flange 45 pressing tightly against the casing 20.

In order to distribute the magnetic flux uniformly and thus obtain a uniform magnetic forcing action and also to direct the magnetic flux into the proper or desired areas, flux shaping means may be utilized. This also allows the magnetic flux to be directed into areas which are inaccessible to the coil itself. For example, FIG. 8 illustrates a coil 90 and flux shaper 92, in section, which may be used for performing bushing assembly operations, such as shown in FIGS. 1 and 2. A casing 94 of the electrical apparatus is illustrated in position. The sleeve member and bushing are a shown in phantom to illustrate their positions relative to flux shaper 92.

The flux shaper 92 is basically a cylinder slotted at the wall and constructed of high-strength copper. It will be noted how the upper portion of flux shaper 92 narrows to obtain access and direct magnetic flux to areas which would be difficult for the coil 90 to achieve. The flux shaper 92 also eliminates uneven flux distribtuions due to such things as "lead effect," and thus insures a uniform swaging action upon the parts to be swaged.

Thus, there has been disclosed a new and improved bushing assembly and method of assembling same. The bushing assembly requires only that the bushing have at least one locking depression circumferential groove, and a cylindrical metallic sleeve member which is magnetically formed to hold the bushing in assembled, sealed relationship with the casing. The opening in the casing of the electrical may or may not be flanged depending upon which embodiment of the invention is being used. No nuts or other auxiliary mounting means are required. There are no parts which will loosen due to vibration of the electrical apparatus due to magnetostriction, or other causes.

The method of assembly is simple, fast, and does not require any particular skill of an operator. Since the capacitors are charged to contain the same amount of stored energy each time, the forming of the sleeve is accurately repeatable, and not dependent upon human judgment. Further, if the embodiment of the invention is used which utilizes a projecting flange around the opening in the casing of the electrical apparatus, it is not necessary to anneal the projecting flange after it is punched, as the flange is not cold worked by the magnetic forming action. The energy from the magnetic forming operation is directed into the cylindrical sleeve, and only the sleeve is formed.

Since numerous changes may be made in the above described apparatus and different embodiments of the invention may be made without departing from the spirit thereof, it is intended that all matter contained in the foregoing description or shown in the accompanying drawings shall be interpreted as illustrative, and not in a limiting sense.

I claim as my invention:

1. In combination, an enclosing metallic casing for electrical apparatus, said casing having at least one flanged portion extending therefrom defining an opening in said casing, a bushing member having at least one locking portion, said bushing member disposed in the opening in said casing with the locking portion located a predetermined distance beyond the extending end of said flanged portion, a metallic sleeve member disposed coaxially over the locking portion of said bushing member and at least a portion of said flanged portion, said sleeve member shaped to tightly contact and closely conform to the complete circumferential contour of both said flanged portion and said bushing member and permanently engaged thereto, said sleeve member independently providing the entire holding means for maintaining said bushing member in assembled, sealed relationship with said casing.

2. In combination, an enclosing metallic casing for electrical apparatus, said casing having at least one annular flanged portion extending therefrom defining an opening in said casing, a bushing member having at least one locking portion, said bushing member positioned axially in the opening in said casing with the locking portion located a predetermined distance beyond the extending end of said flanged portion, a metallic sleeve member disposed coaxially over the locking portion of said bushing member and at least a portion of said flanged portion, said sleeve member shaped to closely conform to the complete circumferential contour of both said flanged portion and said bushing member and permanently engaged thereto, said sleeve member tightly holding both said flanged portion and said bushing member to independently provide the entire holding means for maintaining said bushing member in assembled, sealed relationship with said casing.

3. In combination, an enclosing metallic casing for electrical apparatus, said casing having at least one integral flanged portion extending therefrom to form a hollow cylindrical projection having straight sides which define an opening in said casing, a bushing member having at least one locking portion, said bushing member axially positioned in the opening in said casing with the locking portion located a predetermined distance beyond the extending end of said flanged portion, a metallic sleeve member disposed coaxially over the locking portion of said bushing member and at least a portion of said flanged portion, said sleeve member shaped to closely conform to the complete circumferential contour of both said flanged portion and said bushing member and permanently engaged thereto, said sleeve member tightly contacting both said flanged portion and said bushing member to independently provide the entire holding means for maintaining said bushing member in assembled, sealed relationship with said casing.

4. In combination, an enclosing metallic casing for electrical apparatus, said casing having at least one integral annular flanged portion extending therefrom to form a hollow cylindrical projection having straight sides which define an opening in said casing, a bushing member having at least one locking portion, said bushing member axially disposed in the opening in said casing with the locking portion located a predetermined distance beyond the extending end of said flanged portion, a hollow metallic cylindrical sleeve member disposed coaxially over the locking portion of said bushing member and at least a portion of said flanged portion, said sleeve member having a resilient coating on its internal surface, said sleeve member shaped to closely conform to the complete circumferential contour of both said flange portion and said bushing member and permanently engaged thereto, said sleeve member tightly contacting both said flanged portion and said bushing member to independently provide the entire holding means for maintaining said bushing member in assembled, sealed relationship with said casing.

5. In combination, an enclosing metallic casing for electrical apparatus, said casing having at least one annular flanged portion extending inwardly therefrom to form a hollow cylindrical projection having straight sides which define an opening in said casing, an elongated electrical insulating bushing member having at least one circumferential grooved portion, said bushing member axially positioned in the opening in said casing with the grooved portion located within the casing a predetermined distance beyond the extending end of said flanged portion, a hollow metallic sleeve member disposed coaxially over the grooved portion of said bushing member and at least a portion of said flanged portion, said sleeve member shaped to closely conform to the complete circumferential contour of both said flanged portion and said bushing member and permanently engaged thereto, said sleeve member tightly contacting both said flanged portion and said bushing member to independently provide the entire holding means for maintaining said bushing member in assembled, sealed relationship with said casing.

6. In combination, an enclosing metallic casing for electrical apparatus having at least one opening therein, a bushing member having a generally elongated, cylindrical body portion with at least one projecting portion transverse thereto which has a larger diameter than the opening in said casing, said bushing member having at least one locking portion, said bushing member disposed in the opening in said casing with the projecting portion disposed against the outside of the casing and the locking portion located within the casing a predetermined distance from the opening, an annular resilient member coaxially disposed over the portion of said bushing member disposed within the casing and located against said casing, a cylindrical metallic sleeve member disposed coaxially over the locking portion of said bushing member and a predetermined portion of said annular resilient member to provide a space between said sleeve member and said casing, said sleeve member shaped to tightly conform to the complete circumferential contour of the locking portion of said bushing member and said annular resilient member, said sleeve member, said annular resilient member, and the projecting portion of said bushing member all cooperating to maintain said bushing member in a permanent, assembled, sealed relationship with said casing.

References Cited by the Examiner
UNITED STATES PATENTS

| | | | |
|---|---|---|---|
| 830,501 | 9/06 | Goehst | 174—153 |
| 1,805,874 | 5/31 | Lang et al. | 174—152 |
| 2,014,441 | 9/35 | Matthews | 174—152 X |
| 2,030,370 | 2/36 | Hodtum | 174—153 |
| 2,564,181 | 8/51 | Van Ryan | 174—152 |
| 2,845,477 | 7/58 | Kelley et al. | 174—152 X |
| 2,848,803 | 8/58 | Schock | 29—517 |
| 2,976,907 | 3/61 | Harvey et al. | |
| 3,097,346 | 7/63 | Horelick et al. | |

JOHN F. BURNS, *Primary Examiner.*

LARAMIE E. ASKIN, *Examiner.*